US 7,813,830 B2

(12) United States Patent
Summers et al.

(10) Patent No.: US 7,813,830 B2
(45) Date of Patent: Oct. 12, 2010

(54) METHOD AND AN APPARATUS FOR PERFORMING A PROGRAM CONTROLLED PROCESS ON A COMPONENT

(75) Inventors: Mark Derren Summers, Bristol (GB); Roger Holden, Bristol (GB); Brett Jason Green, Bristol (GB)

(73) Assignee: Airbus UK Limited (GB)

(\*) Notice: Subject to any disclaimer, the term of this patent is extended or adjusted under 35 U.S.C. 154(b) by 316 days.

(21) Appl. No.: 11/994,341

(22) PCT Filed: Jan. 26, 2006

(86) PCT No.: PCT/GB2006/000266

§ 371 (c)(1),
(2), (4) Date: Jun. 9, 2008

(87) PCT Pub. No.: WO2007/003869

PCT Pub. Date: Jan. 11, 2007

(65) Prior Publication Data

US 2008/0319557 A1    Dec. 25, 2008

(30) Foreign Application Priority Data

Jul. 6, 2005   (GB) ................................. 0513899.5

(51) Int. Cl.
*G06F 19/00* (2006.01)
*G05B 19/418* (2006.01)
*G06K 1/18* (2006.01)

(52) U.S. Cl. ................... 700/193; 700/176; 700/182; 700/186; 700/192; 700/248; 234/13; 234/94

(58) Field of Classification Search ................. 700/161, 700/176, 182, 186, 192–193, 248, 253; 234/13, 234/94
See application file for complete search history.

(56) References Cited

U.S. PATENT DOCUMENTS

| 4,219,847 | A | * | 8/1980 | Pinkney et al. | ............... 348/172 |
| 4,314,402 | A | * | 2/1982 | Lemmer | ....................... 29/721 |
| 4,380,696 | A | * | 4/1983 | Masaki | .................. 219/124.34 |
| 4,396,945 | A | * | 8/1983 | DiMatteo et al. | ............. 348/139 |
| 4,402,053 | A | * | 8/1983 | Kelley et al. | ................. 700/259 |

(Continued)

OTHER PUBLICATIONS

Ishida H et al., "Two arc welding robots coordinated with 3-D vision sensor," Industrial Electronics, Control and Instrumentation, 1994. IECON '94., 20th International Conference on Bologna, Italy Sep. 5-9, 2004, New York, NY, USA, IEEE, vol. 2, Sep. 5, 1994; pp. 830-834, XP010137569.

(Continued)

*Primary Examiner*—Ramesh B Patel
(74) *Attorney, Agent, or Firm*—Lowe Hauptman Ham & Berner, LLP

(57) ABSTRACT

A drilling machine drills at a multiplicity of target locations on a component. Two robots, calibrated with calibration data, move the component in a 6-D coordinate system. A metrology system ascertains the position of the component relative to the drilling machine. The movement of the robots is effected by commands generated by off-line programming. The component is moved relative to the drilling machine to a target position, ready for drilling, by a closed-loop process in which the differences in position between the expected position (the target position) and the actual position (as viewed by the metrology system) are corrected.

24 Claims, 6 Drawing Sheets

U.S. PATENT DOCUMENTS

Figure 1A:
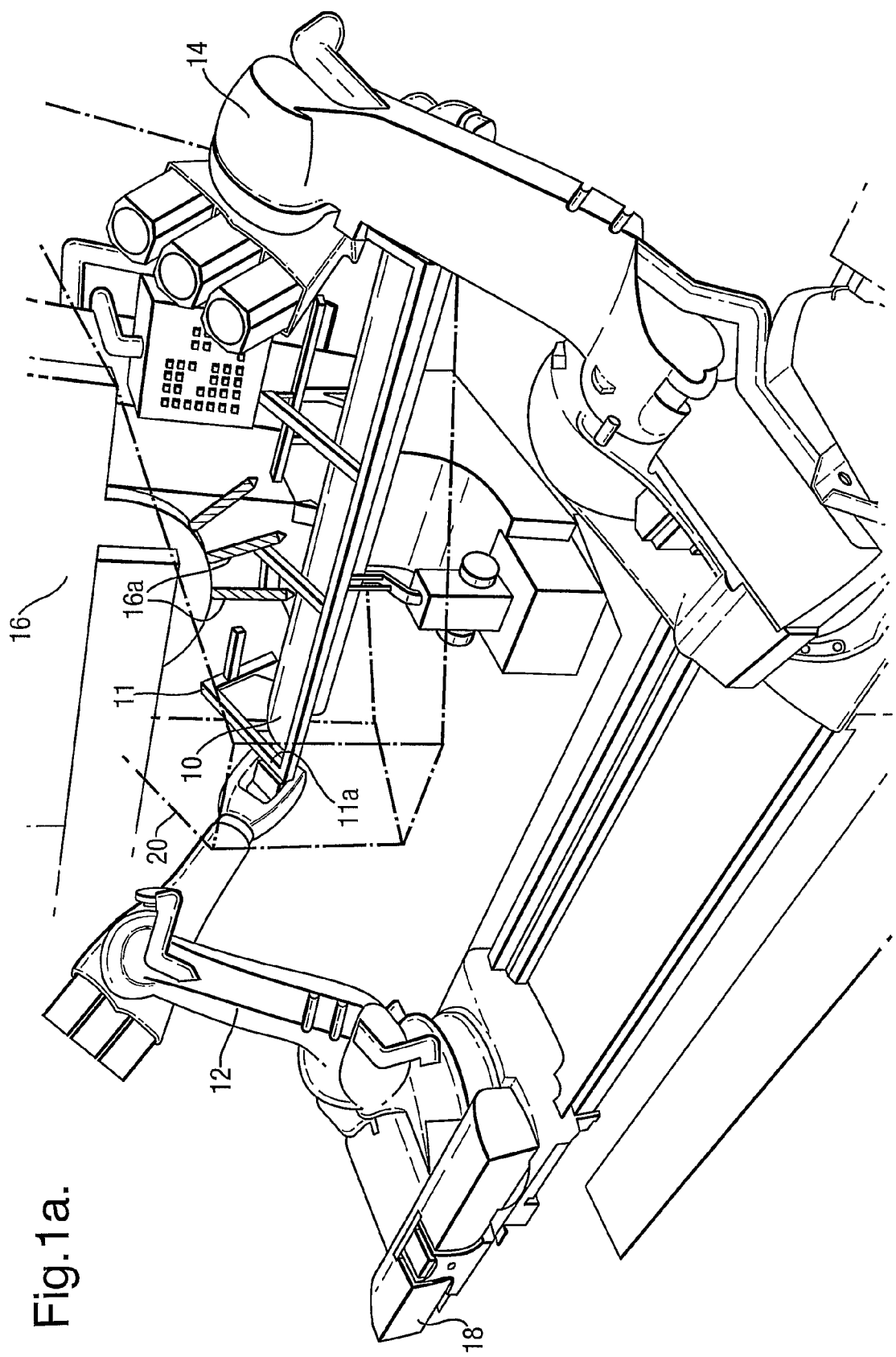

| | | | | |
|---|---|---|---|---|
| 4,412,121 A | * | 10/1983 | Kremers et al. | 219/124.34 |
| 4,602,163 A | | 7/1986 | Pryor et al. | |
| 6,167,607 B1 | * | 1/2001 | Pryor | 29/407.04 |
| 2004/0051059 A1 | * | 3/2004 | Ungpiyakul et al. | 250/559.29 |
| 2005/0283068 A1 | * | 12/2005 | Zuccolotto et al. | 600/410 |
| 2006/0012476 A1 | * | 1/2006 | Markhovsky et al. | 340/539.32 |
| 2006/0167587 A1 | * | 7/2006 | Read | 700/245 |

OTHER PUBLICATIONS

ISR for PCT/GB2006/000266 mailed Oct. 16, 2006.

* cited by examiner ically used in machining certain massive aerospace components may be unable to attain such high accuracies, despite the efforts made in the robotics industry to improve accuracy of such robots.

METHOD AND AN APPARATUS FOR PERFORMING A PROGRAM CONTROLLED PROCESS ON A COMPONENT

RELATED APPLICATIONS

The present application is based on International Application Number PCT/GB2006/000266 filed Jan. 26, 2006, and claims priority from British Application Number 0513899.5 filed Jul. 6, 2005, the disclosures of which are hereby incorporated by reference herein in their entirety.

The present invention relates to a method of performing a program-controlled process on a component and an apparatus therefor.

Machining or performing other processes on components that require actions to be effected on the component at a plurality of different locations with a high degree of accuracy are typically effected with the use of a program-controlled machine, for example, a multi-axis multi-jointed robot. In certain applications, the accuracy of the robot used in the process may be affected by temperature, manufacturing tolerances, and even loading of the robot. Efforts have been made to reduce errors that reduce accuracy arising from such effects, but with limited success. For example, such robots may self-calibrate in dependence on temperature, and on the load carried by the robot. The calculations involved in correcting such errors are complicated and whilst able to improve accuracy to some degree may still render the robot inappropriate for certain applications demanding high accuracy. For example, in the aerospace industry an accuracy of +−0.5 mm may be required, whereas the robots typically used in machining certain massive aerospace components may be unable to attain such high accuracies, despite the efforts made in the robotics industry to improve accuracy of such robots.

The present invention seeks to provide a method of performing a program-controlled process on a component with improved accuracy.

According to a first aspect of the present invention there is provided a method of performing a program-controlled process on a component comprising the following steps:

a) providing
  (i) a component,
  (ii) a first machine arranged to perform a process at a target location on the component,
  (iii) a second, program-controlled, machine for effecting relative movement, in three dimensions and about a plurality of different axes, of the component and the first machine, the second machine being able, upon instruction, to move an object within an acceptable margin of error to a target position,
  (iv) a metrology system for ascertaining the position of the component relative to the first machine,
  (v) component data concerning the shape of the component and including details of a plurality of locations on the component at which processes are to be performed by the first machine, and
  (vi) process data including details of movements to be made by the second machine to enable processes to be performed by the first machine on the component at said plurality of different locations on the component, b) issuing a command to perform a process on the component at a target location on the component, c) in dependence on the process data, causing the second machine to effect relative movement of the component and the first machine towards a target position, at which the first machine and component are so positioned relative to each other that the first machine is aligned to perform a process at the target location on the component, d) ascertaining with the metrology system and the component data the relative position of the target location on the component and the first machine, e) calculating the relative movement required, if any, to move the component and the first machine to the target position by means of a calculation using inputs concerning (i) the expected position of the first machine relative to the component and (ii) the actual relative position of the component and the first machine as ascertained in step d), f) repeating steps (c), (d) and (e) as part of a closed-loop process until the second machine has effected relative movement of the component and the first machine to the target position with a given degree of accuracy, g) effecting a process with the first machine on the component, and h) repeating steps b) to g) in respect of a plurality of locations on the component in accordance with the process data.

Thus the method of this aspect of the present invention facilitates the integration of a metrology system with a program-controlled machine for effecting relative movement of a component and a machine arranged to perform a process on the component. In an embodiment of the invention, the integration of the metrology system with the program-controlled machine is advantageously so effected that process data enables the component and first machine to be moved into approximate alignment with a target position, and component data, for example CAD data, can then be used in a closed-loop process in which the actual relative position of the component and the first machine may be ascertained and then corrected in view of information from the metrology system and the component data. The method of such an embodiment of the invention thus facilitates greater accuracy of performing processes on a component at predetermined locations than the prior art systems mentioned above that have focussed on solely improving the accuracy of the positioning of a robot. In particular, the method of such an embodiment of the present invention enables CAD data to be used when performing processes on a component to ensure that the locations on the component of the performance of the processes is in accordance with the target locations by direct reference to the CAD data.

Preferably, there is provided a processor for performing step e). A processor may be arranged to issue the command to perform a process on the component at a target location (step b). A processor may be arranged to cause the movement of the second machine. Preferably, there is further provided a memory for storing the component data, and/or the process data, and the processor is arranged to read data stored in the memory. The processor and memory may together form a processing unit.

It will of course be appreciated that separate processors may be provided to perform such actions. In a case where the first machine, the second machine and the metrology system are sourced from separate suppliers, it may be that each is provided with a separated dedicated processor and a further processor is provided for controlling the performance of the method of the invention. Alternatively a single processor may be provided to perform such actions. For example, a single processor may be provided for controlling the first machine, the second machine and the metrology system.

The method is of particular application in a case where the method includes effecting a process at a multiplicity of different locations on a single component with the first machine by performing steps b) to g) in respect of each such location. Steps b) to g) are preferably repeated for substantially all locations on the component at which the first machine performs a process.

The method may be performed in respect of a plurality of components all to be processed in the same way. In such a case, the method may include storing, for example in memory accessible by a processor controlling the process, offset data concerning the difference between the position attained as a result of effecting movement in accordance with the process data in respect of a target location on the component (and without performing the closed-loop position-correcting process) and the target position. Such offset data can then be used in successive performances of the method on a further component, to be processed in accordance with the same component data, such that the second machine can initially effect relative movement of the component and the first machine to a position in accordance with the process data in view of the offset data.

The method may be performed to calibrate the movements to be effected by the second machine. Such a method may be performed to enable the second machine to effect relative movement of the component and the first machine with a given degree of accuracy without further need of the metrology system. In accordance with this aspect of the present invention, the method may be considered as a closed-loop calibration system for calibrating a program-controlled machine that effects relative movements of objects in space. It will be appreciated that in performing such a calibration method, the provision of a component and the performance of processes on a component may be optional features. However, it is preferred that the calibration method be performed as if the component were being processed in accordance with aspects of the method of the invention as described herein which require processes to be performed on a component. The method may further include storing details of the movements effected by the second machine taking into account any correcting movements made as part of the closed-loop position-correcting process and then performing processes at locations on a further component using the details so stored. Thus, after the movements effected by the second machine have been calibrated in relation to performing processes at locations on a component in accordance with component data, the use of a metrology system may be optional in relation to performing processes on a further component in accordance with the same component data.

Step c) may include causing the second machine to effect relative movement of the component and the first machine towards the target position in dependence on such offset data. After effecting relative movement of the component and the first machine in dependence on the process data and the offset data, the closed-loop position-correcting process may be performed in order to bring the component and the first machine into alignment with the target position with a given degree of accuracy. Using offset data in this way can significantly improve the accuracy of the initial movement to the target position effected by the second machine before performance of the closed-loop process and can therefore improve processing cycle times. Those skilled in the art will appreciate that robots, once suitably programmed, may be able to perform previously conducted movements with little or negligible discrepancies between the positions attained on successive repeats of the same movements, despite the absolute accuracy of the robot being subject to much greater discrepancies between actual and target positions.

The calculation using (i) the expected position of the first machine relative to the component and (ii) the actual relative position as ascertained in step (d) may involve a step of comparing (i) the expected relative position with (ii) the actual relative position. For example, the calculation may include a step of ascertaining the difference (or differences) between (i) the expected relative position and (ii) the actual relative position. The calculation may include assessing whether the expected and the actual relative positions meet preset criteria. For example, the difference (or differences) between (i) the expected relative position and (ii) the actual relative position may be compared to preset criteria. Such preset criteria may include one or more thresholds, such that if the one or more differences as calculated are below the one or more thresholds no corrective action is deemed required. The preset criteria may define the degree of accuracy of positioning the component and first machine in alignment with the target position.

It will be appreciated that at least some of the steps of the method of the invention need not necessarily be performed in order. For example, step (d) may be performed before or after step (c). Step (d) is preferably performed after step (b). Step (e) is preferably performed after steps (c) and (d).

The method may be so performed that, in respect of the steps performed in order for the first machine to perform a process at a single target location on the component, the second machine is caused to effect relative movement of the component and the first machine substantially the entire way to a position in accordance with the target location and then step (f) is performed for the first time. Accordingly, the method may be performed such that as an initial step the relative positions of the first machine and the component are brought into approximate alignment by means of the second machine with the use of the process data that does not necessarily enable accurate movement to the target position (for example, the second machine is only able to effect movement to a given position within a margin of error that is much greater than the degree of accuracy required) and thereafter a closed-loop process is performed (by means of step f) to bring the component and the first machine into accurate alignment.

The input concerning the expected position of the first machine relative to the component, as used in step e), may be calculated in view of information concerning the position of the second machine. The expected position of the first machine relative to the component may be calculated with the use of calibration data that is used to calibrate the movements of the second machine. For example, such calibration data may form part of a kinematic model of the second machine that allows the second machine to effect movements within a given margin of error. The expected position may be considered as the position in which the second machine "expects" the component to be relative to the first machine. The calculation of the input concerning the expected position may additionally use data that relates the position of the component relative to a position of a feature able to be measured by the metrology system. The expected and actual positions of the component used in the calculation may thus comprise expected and actual positions of one or more features able to be measured by the metrology system. The calculation may thus effectively comprise a direct comparison of the actual and expected positions of one or more features dependent on the position of the component in the same coordinate system. The calculation of the input concerning the expected position or the actual position may use the component data.

It will be appreciated that, in the case where step (e) is performed after the second machine has effected movement in order to bring the component and first machine into alignment in accordance with the target location, the expected position will be the position that is in accordance with the target location with possible discrepancies relating for example to errors or inaccuracies in the movement effected by the second machine. (This may, for example, be explained by considering that the second machine "expects" to have made the movements necessary to bring the component and first machine into alignment in accordance with the target location.)

The method may be so performed that, in respect of the steps performed in order for the first machine to perform a process at a single target location on the component, steps (c), (d) and (e) are repeatedly performed during the relative movement of the component and the first machine and before there is effected relative movement of the component and the first machine substantially the entire way to the position in accordance with the target location.

The metrology system may detect the relative position of the component and the first machine a multiplicity of times for each process cycle. Any or all of steps (c), (d) and (e) may be performed many times during each process cycle. For example, step (d) may be performed many times per second and may be performed more frequently than ten times per second.

It will be appreciated that the relative position of the component and the first machine may be ascertained without either ascertaining the absolute position of the component or the first machine relative to another fixed reference. The relative position may be ascertained by detecting the position of an object that is fixed relative to the component and or the first machine. Thus, the metrology system need not directly measure the position of either the component or the first machine. The metrology system may make measurements that yield a parameter that allows the change in the relative position to be ascertained, there being provided sufficient data that allows the relative position to be calculated.

In accordance with the method of the invention, steps (c), (d) and (e) are performed as part of a closed-loop system for enabling the second machine to effect relative movement of the component and the first machine to a position in accordance with the target location with a given degree of accuracy. Such degree of accuracy may be determined in advance and defined, preferably after or during installation of the second machine or for example by the end-user. The degree of accuracy may be defined by preset criteria. For ex ample, the preset criteria may include limits on the absolute distance between the target location on the component and the actual location at which the performance of a process by the first machine on the component is to take place. Such a limit may for example be less than 0.5 mm and may be of the order of 0.2 mm or less. In the case where the performing of a process on the component at a given location is defined not only by a position in three dimensions on the component, but also by a direction with one or more degrees of freedom, the preset criteria may also include limits on the absolute deviation from the target direction relating to the process to be performed on the component. For example, the criteria may set a threshold angle of deviation from the target direction, under which threshold any error in orientation is deemed to be acceptable.

The process data preferably includes information concerning the actions required to be made by the second machine in order to bring the component at least into approximate alignment with the first machine in order to perform a process on the component at each of a multiplicity of different locations.

Preferably, the process data is, in advance of the performing of the process at the first location, calculated from component data, for example in the form of a computer model of the component. The computer model may be in the form of a CAD model. Preferably, the process data comprises commands passable by the second machine. Thus, much of the processing needed to control the movements effected by the second machine may be conducted off-line and separately from the performance of the processes on the component.

The actions required to be made by the second machine in order to bring the component into substantially exact alignment with the machine in order to perform a process on the component at each of a multiplicity of different locations may be calculated in advance, for example by means of off-line programming, to produce a sequence of commands for instructing the movements to be effected by the second machine. It will of course be appreciated that if the second machine were moved in accordance with the sequence of commands so produced, whether or not the component would actually be brought into exact alignment with the first machine in respect of each of the multiplicity of different locations would depend on the accuracy of the movements effected by the second machine. The process data may therefore be in the form of OLP (off-line processing data). OLP data may comprise a sequence of a plurality of movements to be made by the second machine in respect of a given location on the component to be processed by the first machine. There may for example be movements to intermediate relative positions, between successive target positions, of the component and the first machine that the second machine effects to avoid a collision.

The second machine may include a dedicated controller for controlling the movement of the second machine, such that the commands produced during performance of this aspect of the invention are passable by the controller.

The computer model of the component that may be used to produce the process data, is preferably a model of the fully processed component (i.e. after completion of all of the processes performed by the first machine). The component data may be in the form of a model of the fully processed component (i.e. after completion of all of the processes performed by the first machine). The component data may for example be in the form of CAD data. It will of course be appreciated that the physical component on which processes are performed by means of the method of the invention may differ from the component represented by the component data. For example, in the case where the processes change the shape of the physical component, the shape of the component will change, as for example material is machined away from the component, during the performance of the method. Also, the component may after performance of the method of the present invention be subjected to further processing, and the CAD model may include details of the component once such further processes are conducted. Thus at the end of the performance of the method of the present invention the physical component may only represent an intermediate state of the component as represented by the component data. The component data may be generated by means of using the metrology system to ascertain the shape of a previously manufactured component.

Preferably, the sequence of commands produced is checked prior to performing steps (b) to (h) by means of a simulation of the performance of the method on a component. The sequence of commands produced may for example be checked to ensure that the metrology system will be able to measure adequately the relative positions of the component and the first machine during performance of the method.

Also, the sequence of commands produced may for example be checked to ensure that there are no singularities during the movement of the second machine during the performance of steps (b) to (h). A singularity might occur, for example, where a part of the second machine is able to be rotated about two different axes and, during the movements, the two axes are positioned such that movement of a part of the second machine about an axis can equally be effected by moving the second machine about either of the two axes. Such a choice between axes of rotation can, if appropriate measures are not taken, lead to the second machine failing.

The second machine may be calibrated by means of calibration data, the calibration data enabling the second machine to move an object within the acceptable margin of error to a target position. The second machine may be pre-calibrated, with calibration data for example, to take account of discrepancies arising as a result of manufacturing tolerances. It will be appreciated that any discrepancy between the target position obtained by movement effected by the second machine and the actual position may be as a result of inaccurate or out of date calibration data. As such, the closed-loop process conducted to effect movement of the component and the first machine to the target position may include a step of refreshing the calibration data in view of the discrepancies between the actual and expected relative positions of the component and the first machine. Such a recalibration may be performed once in respect of a plurality of components. It may be conducted once per component. It may even be conducted every time the closed-loop position-correcting process is performed. Where the calibration data is updated or refreshed, the calibration data may be stored in memory accessible by a processor used in performing the method. It will be appreciated that with sufficiently accurate calibration data the second machine would be able during steps (b) to (h) to effect movements to align the component and the first machine in relation to the target locations with said given degree of accuracy. Thus, in the case where there the calibration data is refreshed in respect of each location, there may be no need for there to be any processing to translate errors between target and actual positions of any objects into corrective movements in commands passable by the second machine.

The metrology system may be able to measure the position of a part of an object in a coordinate system having at least three degrees of freedom. The metrology system may be able to measure the position of a plurality of different parts of the component. The metrology system may be able to measure the position of a plurality of different parts of the second machine. The metrology system may be so arranged that during step (d) it ascertains the position of only certain fixed points on the object to be measured. The object to be measured may of course be the first machine, the second machine, the component or a reference spot. The measuring of the position of an object by the metrology system may be effected by means of measuring the positions of points that are fixed in space relative to the object. For example, the position of the component may be measured by means of detecting the position of a jig that holds the component in a single orientation.

In accordance with the invention the relative position of the component, for example the target location on the component, and the first machine is advantageously ascertained with the metrology system with the use of the component data. As mentioned above, such component data may comprise CAD data. The component data may include data concerning the positional relationship between the position of the component and one or more features, on the component or on another object, that are during the performance of the method of the invention positioned in fixed relation to the component and which may readily be measured by the metrology system. For example, such features may be readily identifiable features on the component or features on a jig holding the component.

The method may include a step of identifying the relationship between the position of the component and said one or more features. The one or more features may for example be in the form of light spots that are fixed relative to the component. The method may include a step of using the metrology system to identify the position of the component by means of recognising the shape of the component or one or more portions of the component. Once the position of the component has been ascertained by the metrology system the relationship between the position(s) of the one or more features, (those features to be recognised by the metrology system during step (d) of the method when ascertaining the relative position of the component), and the position of the component may be identified. In the case where the one or more features are in the form of light spots or other easy to measure features, the metrology system is then able, in use, to readily identify the position of the component without needing to recognise shape of the component or one or more portions of the component. The metrology system may effectively track a notional reference frame that is defined by the position of the one or more features. The position of the reference frame may be ascertained by means of the metrology system ascertaining the position of the one or more features, and the position(s) of the component and/or the locations on the component to be processed by the first machine may be ascertained by means of knowledge of their position(s) relative to the notional reference frame. (It will of course be appreciated that if the position of the component is to be ascertained with six degrees of freedom then the one or more features on the component, if in the form of points, must comprise at least three points fixed in space relative to the component.)

The metrology system is preferably arranged to ascertain the positions of a multiplicity of different points fixed on an object. The metrology system may for example be arranged to ascertain the position of each of at least three and preferably at least six different points fixed on an object. The points detected may be reference points. In such a case the method may include a step during which the relative position of the first machine and the component are related to the detected position of the different points detected by the metrology system.

The three or more different points measured by the metrology system may all be on the same object, for example on the component. Being able to ascertain the position of more than three different points on the same object may allow the method of an embodiment of the invention to account for deformation of the shape of the object from an expected shape (for example a previously measured shape). For example, the component may change shape as a result of thermal expansion, or as a result of deforming under the action of gravity.

The metrology system may alternatively or additionally be arranged to ascertain the position of at least three different fixed points on the first machine. The metrology system may alternatively or additionally be arranged to ascertain the position of at least three different fixed points on the second machine. The metrology system may alternatively or additionally be arranged to ascertain the position of at least three different fixed points on a reference object. Such a reference object preferably has a known location. Alternatively or additionally, the reference object may be fixed in space.

The metrology system may be arranged such that it ascertains the position of an object by means of detecting electromagnetic radiation. The metrology system may be arranged such that it views an object by means of detecting visible or infra-red light.

The method may be so performed that during step (d) the metrology system views a multiplicity of points defined by light spots. The light spots may be in the form of reflectors that reflect light. The light spots may alternatively be illuminated light sources, for example infra-red LEDs.

The relative movement that the second machine is able to effect preferably allows the first machine and the component to be moved relative to each other with at least five, and preferably six, degrees of freedom.

The second machine may comprise a multiplicity of pairs of parts, each part of each pair being rotatably mounted relative to the other part of the pair. For example, the second machine may comprise a multiplicity of rotating joints. The plurality of different axes about which the second machine may effect relative movement are preferably movable relative to each other. The second machine may for example comprise at least five sets of rotating joints.

The second machine may comprise a multiplicity of independently driveable actuators. The second machine may comprise a robot. The second machine may comprise a plurality of robots for effecting the relative movement of the component and the first machine. The or each robot may be in the form of a multi-axis rotational robot, for example a six-axis rotational robot. The use of one or more multi-axis robots provides greater flexibility in the movement of the robot(s) but complicates the calibration of the robot geometry. This is because the or each robot has many different "solutions" (or ways) to move an object to a point having a particular location, because the configuration of the axis positions is typically such that the same point may be reached via more than one route (and typically with more than one configuration of the robot axes). As a result of the calibration of the geometry of such robots being so complex, the use of an embodiment of the present invention, in which the metrology system is advantageously present during operation of the robot(s), is particularly beneficial.

The second machine may be arranged to hold and move the component relative to fixed space.

The second machine may be arranged to hold the component at two separate locations. The part of the component at each of the two locations is preferably able to be moved in space by the second machine with at least three degrees of freedom. For example, the component may be held and manipulated at one end by one robot and the component may be held and manipulated at other end by another robot.

The metrology system may be arranged to output data concerning the relative position of the component and the first machine in a first coordinate system. The method may be so performed that the movements effected by the second machine are in response to commands using a second coordinate system. The second coordinate system may be different from the first coordinate system. For example, the first coordinate system may be a Cartesian system whereas the second coordinate system may be a coordinate system making use of the relative rotational positions of a multiplicity of pairs of parts of the second machine (for example in the case where the second machine comprises a multiplicity of pairs of parts each part of each pair being rotatable mounted relative to the other part of the pair).

Data may for example be provided that converts between the first and second coordinate systems and may for example include calibration data. The calibration data may be sufficient to allow the conversion between the first and second coordinate systems. Alternatively, further conversion data may be required to allow conversion between the first and second coordinate systems.

The performance of the method may be performed in such a way that there is no need for knowledge of the actual position or orientation in fixed space of the component or of the first machine. The relative position of the component and the first machine may be ascertained by measuring the positions of one or more features that are fixed in position relative to one of the first machine and the component and establishing a first notional reference frame and then ascertaining the positions of one or more features of the other of the first machine and the component and defining a second notional reference frame and then ascertaining the position of the first reference frame relative to the second reference frame in a single coordinate system. Thus, one of the component and the first machine may be used as an origin in a single coordinate system. The coordinate system so used may thus move in fixed space.

The method may include an initial step of mounting the component and obtaining an initial indication of the position of the component relative to the first machine. The initial indication of the position of the component relative to the first machine may be obtained by means of manually aligning a teaching wand. The initial indication of the position of the component relative to the first machine may be obtained by means of detecting standard reference points in predetermined positions. The initial indication of the position of the component relative to the first machine may be obtained by means of detecting and recognising the shape and its position and orientation.

The method may be so performed that the first machine effects a process on the component with a direction having at least two degrees of freedom. The process performed by the first machine may be in the form of a machining action. The machining action may be in the form of a grinding action. The machining action may be in the form of a drilling action. The first machine may be a drilling machine. The process performed by the first machine may be one that does not affect the shape of the component. The process performed may comprise applying a substance onto the component at a desired location. The substance could for example be an adhesive or a paint or another coating material. The process performed may be to measure a parameter at a particular location on the component. The process to be performed may be conducted along a preset path. In such a case, the method of the invention may be performed in order to bring the component and the first machine into accurate alignment so that the first machine can start processing of the component at the start of the path. Thereafter, the metrology system may advantageously be used to directly control the relative movement of the first machine and component along the path, along which the process is to be performed. The control of the relative movement of the first machine and the component along the path is preferably controlled with use of component data. In such a case the component data advantageously includes details of the process path on the component, for example details the layout of the path on the component.

The first machine may comprise a multiplicity of independently driveable actuators. The first machine may comprise a robot. The first machine may comprise a plurality of robots.

During performance of the method, the first machine may be fixed in position. It will however be appreciated that the method is able to be performed effectively whether or not the first machine is fixed in position. The method is therefore able to account for accidental movements of the first machine even though the machine is configured with the intention of the machine being fixed in position. Moreover, the performance of the method may be such that both the component and the first machine are moved relative to fixed space and/or the metrology system.

The method of the present invention may be of particular application in relation to the machining of large and/or massive components. For example, the component may have a mass greater than 1 Kg. The component may have a mass greater than 10 Kg. The component may have a maximum dimension of greater than 200 mm. The component may have a maximum dimension of greater than 500 mm, or even greater than 1 m. The component may be an aerospace component.

The method may be so performed that the second machine effects movement of the component relative to fixed space.

It will of course be appreciated that certain terms used herein in relation to the data used in the method can merely be considered as labels to enable the reader to distinguish between types of data or between the same types of data at different stages in the performance of the method. Examples of such terms include "process data", "component data" and "calibration data".

In accordance with various aspects of the present invention actions, such as making correcting movements, are stated to be effected in response to the "difference" between expected and actual positions. It will be appreciated of course that any calculation that is performed to assess what action should be taken need not include a calculation in which such a difference is actually explicitly ascertained. Also, it may be the case that if the difference or differences meets certain preset criteria, the difference is deemed to be acceptable, thereby not requiring any action.

According to certain aspects, the present invention seeks to align a component and a first machine in accordance with a "target location". It will be appreciated that in certain applications, the process to be performed on the component may require the component to be aligned with the first machine both so that the first machine is able to act on the component at a certain location on the component, and also so that the first machine may act in a given direction relative to the component. The target location may thus be considered as being defined by a target position of the first machine relative to the component. Such a target position may require five, and possibly six, independent variables to define the target position. In other cases, for example where the process to be performed by the first machine simply requires a tool of the machine to contact the component at the target location without any particular direction, there may be one or more degrees of freedom in relation to possible relative positions of the component and the first machine in which the component and first machine are correctly aligned.

The present invention also provides an apparatus for performing the method of the invention as described herein.

According to a second aspect of the present invention, there is provided an apparatus for use in the manufacture of a component, for example an aircraft component having a mass of greater than 1 kg, the apparatus comprising:
  a first machine for performing a process on a component,
  a second, program-controlled, machine for effecting relative movement, in three dimensions and about a plurality of different axes, of the first machine and a component,
  a metrology system for ascertaining the position of the component relative to the first machine,
  a processor arranged to send signals to the second machine and to receive signals from the metrology system, and memory, accessible by the processor, for storing component data concerning the shape of the component and including details of a plurality of locations on the component at which processes are to be performed by the first machine, and for storing process data including details of movements to be made by the second machine to enable processes to be performed by the first machine on the component at said plurality of different locations on the component,
the apparatus being arranged so that
a) in use, process data stored in the memory is used by the processor to instruct the second machine to effect relative movement of the first machine and a component towards a target position, at which the first machine and component are so positioned relative to each other that the first machine is aligned to perform a process at a target location on the component,
and so that
b) in use, during each cycle of operation that results in the first machine performing a process on the component, the apparatus performs a closed-loop process resulting in the second machine effecting relative movement of the component and the first machine to a position in accordance with the target location with a given degree of accuracy,
and the processor being so programmed that
c) in use, the closed-loop process includes the processor repeating the following steps:
  i) obtaining a first input concerning the expected position of the first machine relative to the component,
  ii) ascertaining a second input concerning the actual relative position of the target location on the component and the first machine by means of data received from the metrology system and the component data stored in the memory, and
  iii) ascertaining whether the first and second inputs are such that the relative position of the component and the first machine is in accordance with the target position with a given degree of accuracy.

The processor may also be arranged to control the performing of processes by the first machine on the component. The processor may also be arranged to control the metrology system. During performance of the closed-loop process, the processor may cause the second machine to perform corrective movements in response to a calculation involving the first and second inputs. The programming of the processor so that it obtains a first input concerning the expected position of the first machine relative to the component may simply be in the form of programming that causes the processor to derive the first input from the target location/position. Thus, the information concerning the position of the second machine that is used may for example simply be in the form of a flag that indicates that the second machine has completed its effecting of relative movement of the component and the first machine up to the target position in accordance with the process data.

The present invention further provides a processing unit programmed to perform the steps performed by the processor of the method according to any aspect of the invention described herein. The processing unit includes for example a suitably programmed processor and a memory accessible by the processor.

According to a third aspect of the present invention, there is provided a processing unit for use in a method of performing a program-controlled process on a component, the method using a first machine to perform a process on the component at a target location on the component, a second, program-controlled, machine for effecting relative movement of the first machine and the component, and a metrology system for ascertaining the relative positions of the component and the first machine, the processing unit including a processor and a memory accessible by the processor, wherein a) the processor is so arranged as to be able in use:
   to send signals derived from process data stored in the memory to the second machine instructing the second machine to effect relative movement of the first machine and a component towards a position so that the first machine may then perform a process on the component at a target location on the component, the process data including details of the movements to be made by the second machine to enable processes to be performed by the first machine on the component at a plurality of different locations on the component, and
   to receive signals from the metrology system, which together with component data, stored in the memory, concerning the shape of the component and including details of said plurality of locations on the component, provide information concerning the actual relative position of a location on the component at which a process is to be performed and the first machine, b) the processor is so programmed that in use during each cycle of operation that results in the first machine performing a process on the component, a closed-loop process is performed during which the second machine effects relative movement of the component and the first machine to a target position, at which the first machine and component are so positioned relative to each other that the first machine is aligned, with a given degree of accuracy, to perform a process at the target location on the component, c) the processor is programmed to repeat the following steps during the performance of the closed-loop process:
   i) obtaining a first input concerning the expected position of the first machine relative to the component,
   ii) receiving and using data from the metrology system together with component data to ascertain a second input concerning the actual relative position of the target location on the component and the first machine, and
   iii) ascertaining whether the first and second inputs are such that the relative position of the component and the first machine is in accordance with the target position with a given degree of accuracy, until the processor ascertains that the relative position of the component and the first machine is in accordance with the target position with the given degree of accuracy. The processor may be so programmed as to be able in use to ascertain data concerning the position of the second machine. Such data may be used by the processor to ascertain the expected position.

The present invention also provides a programmed processor for use as the processor used when performing any aspect of the method of the invention described herein or for use as the programmed processor of the processing unit of the invention described herein. The processor may be provided with a memory for storing calibration data.

The present invention further provides software, for example in the form of a computer software product, for programming a processor to produce the programmed processor of any aspect of the invention described herein. The software may for example be recorded in electronic form on suitable electronic media.

According to a fourth aspect of the present invention, there is provided software for programming a processor of a processing unit, the processing unit including a memory and being for use in a method of performing a process on a component, the method using a first machine to perform a process on the component at a target location on the component, a second machine for effecting relative movement of the first machine and the component, and a metrology system for ascertaining the relative positions of the component and the first machine, the software enabling the processor, once programmed with the software, to be able in use:

a) to receive process data from the memory of the processing unit, and to send instructions to the second machine to effect relative movement of the first machine and a component to a position so that the first machine may then perform a process on the component at a target location on the component, the process data including details of the movements to be made by the second machine to enable processes to be performed by the first machine on the component at a plurality of different locations on the component, b) to receive data from the metrology system and component data, from the memory of the processing unit, the component data concerning the shape of the component and including details of said plurality of locations on the component, which together may be used to ascertain the actual relative position of a location on the component at which a process is to be performed and the first machine, and c) to perform a closed-loop process which enables the second machine to effect relative movement of the component and the first machine to a target position, at which the first machine and component are so positioned relative to each other that the first machine is aligned, with a given degree of accuracy, to perform a process at the target location on the component, wherein (d) the software includes a closed-loop module that is arranged to cause the processor to repeat the following steps:
   i) obtaining a first input concerning the expected position of the first machine relative to the component,
   ii) receiving and using data from the metrology system together with component data to ascertain a second input concerning the actual relative position of the target location on the component and the first machine, and
   iii) ascertaining whether the first and second inputs are such that the relative position of the component and the first machine is in accordance with the target position with a given degree of accuracy,
   until the processor ascertains that the relative position of the component and the first machine is in accordance with the target position with the given degree of accuracy.

It will of course be appreciated that any of the above-described apparatus, processing unit, processor, and software may incorporate any of the features described with reference to the method of the invention described herein or any other aspect of the present invention. Also, the method of the invention may include a step of using apparatus, processing unit, processor, and software according to any aspect of the invention described herein.

According to a fifth aspect of the present invention, there is provided a component on which there has been performed processes by means of the performance of the method according to any aspect of the invention described herein, by means of using the apparatus according to any aspect of the invention described herein, by means of using an apparatus including a processor according to any aspect of the invention described herein, or by means of using an apparatus including a processor programmed with software according to any aspect of the invention described herein.

Figure 1B:
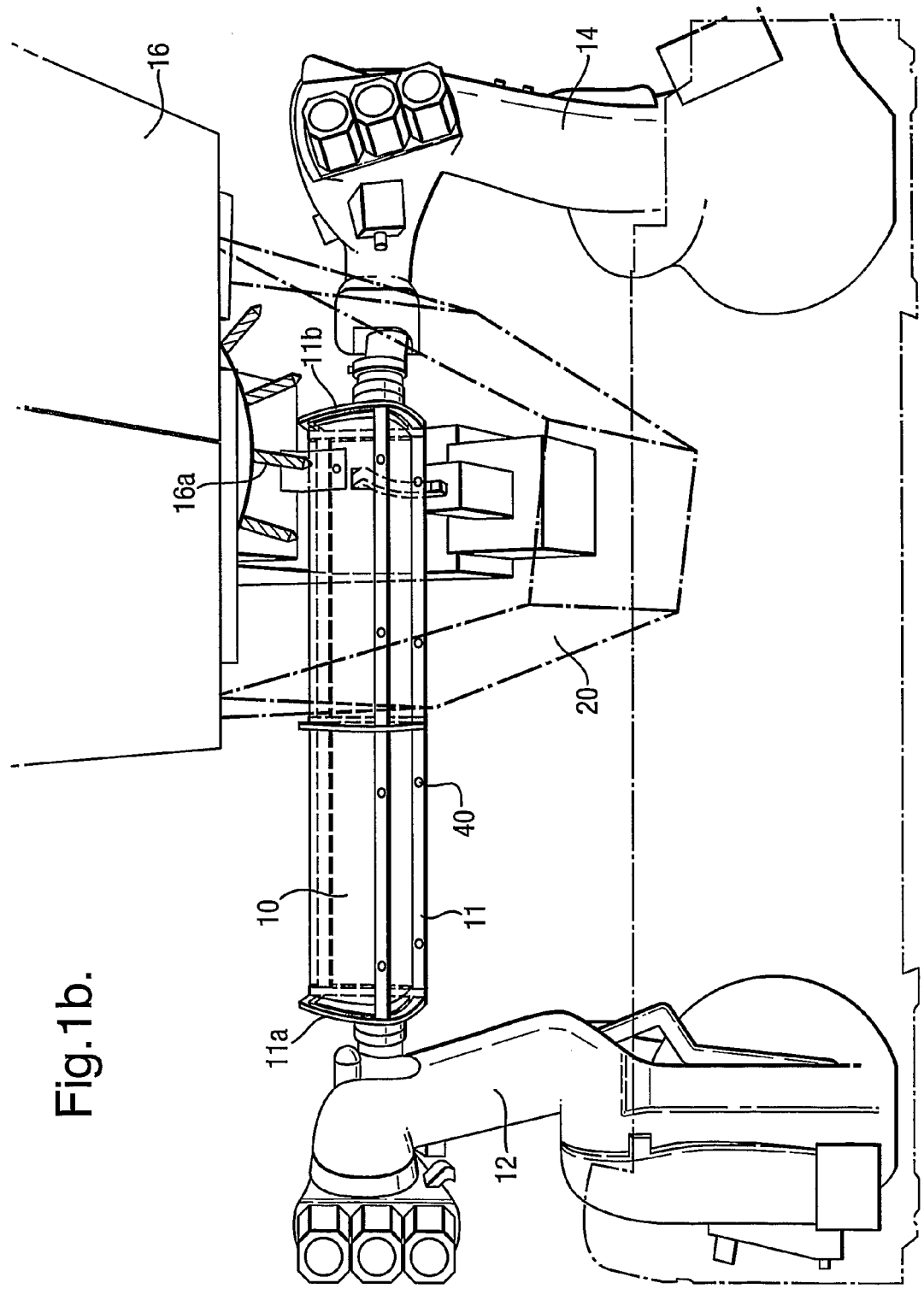
Figure 1C:
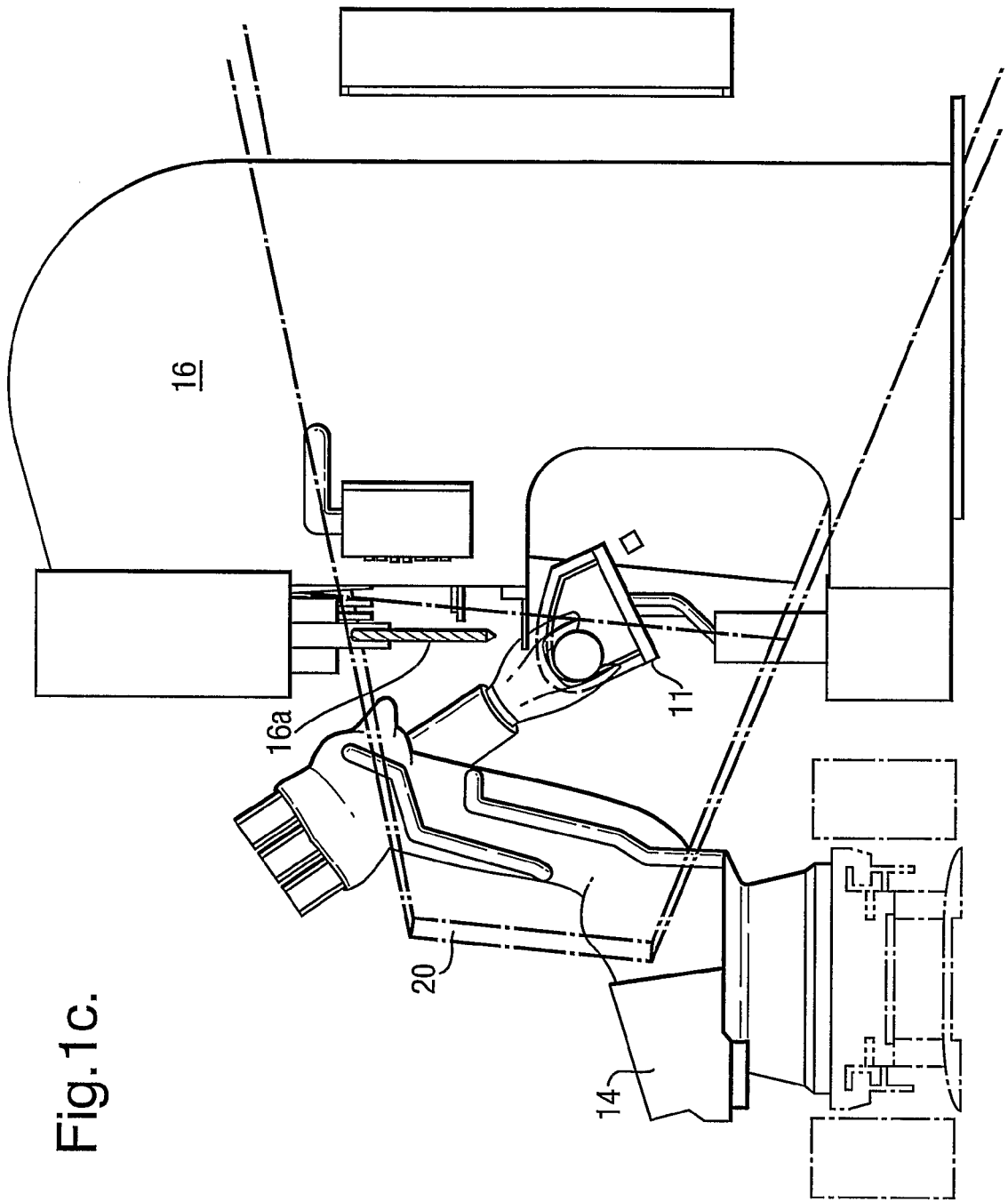
Figure 1C:
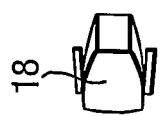
Figure 2:
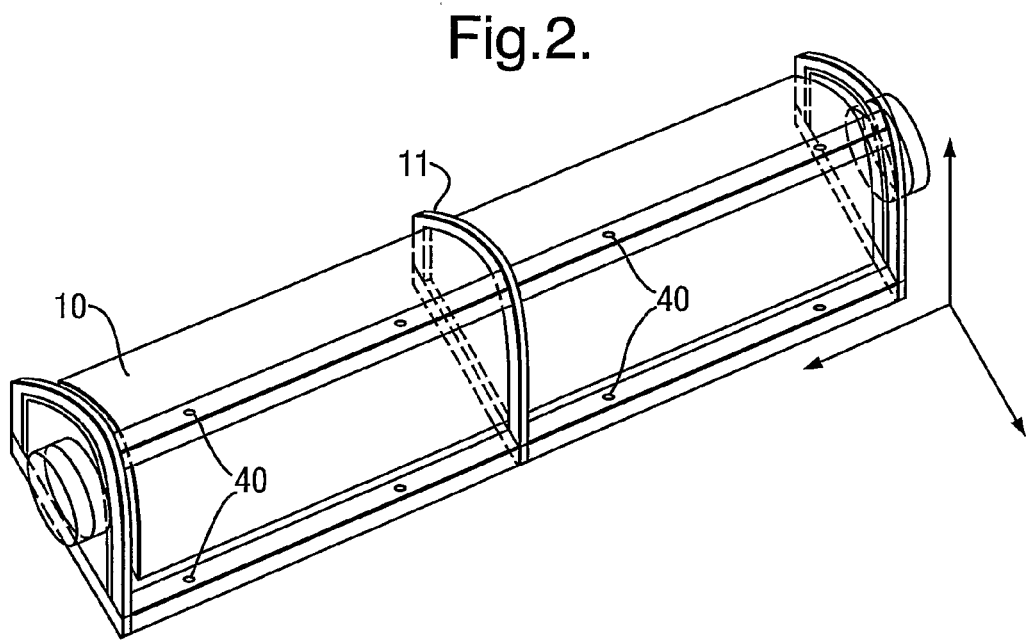
Figure 3:
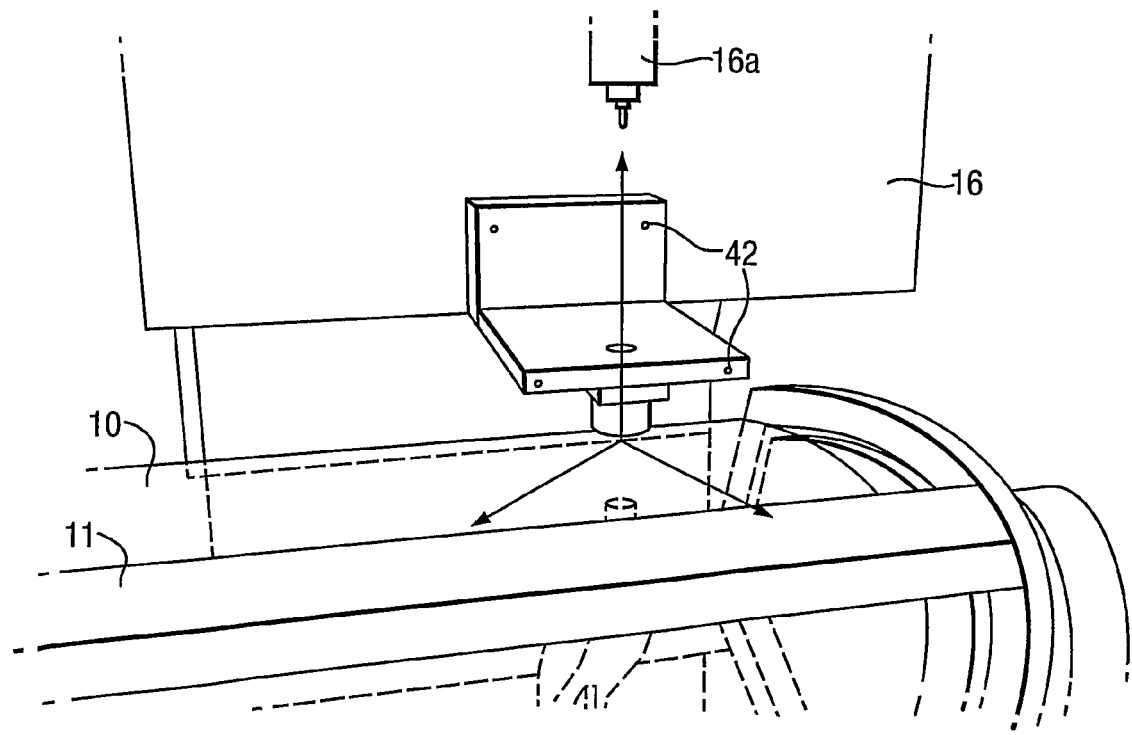
Figure 4:
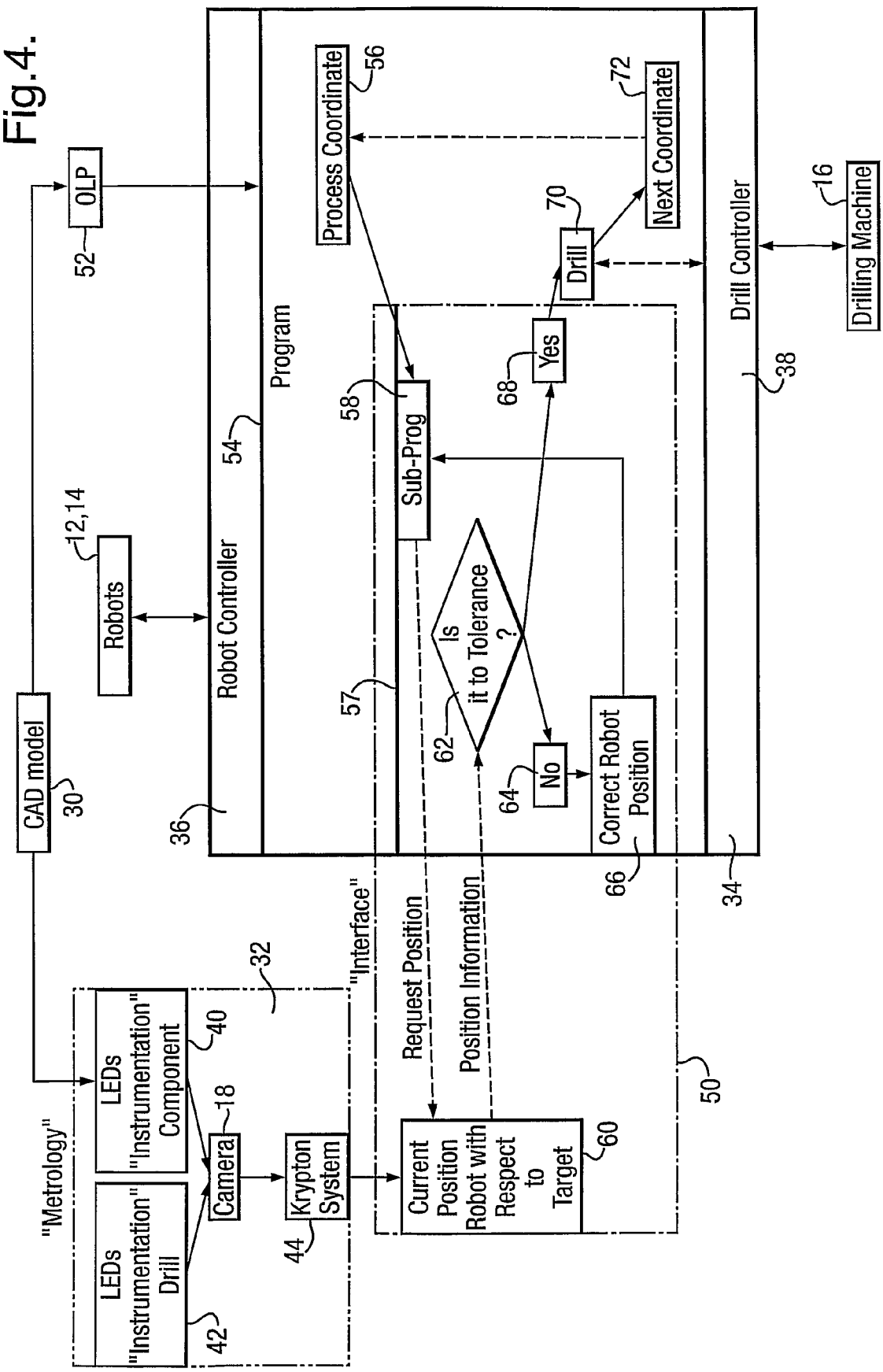
Figure 5:
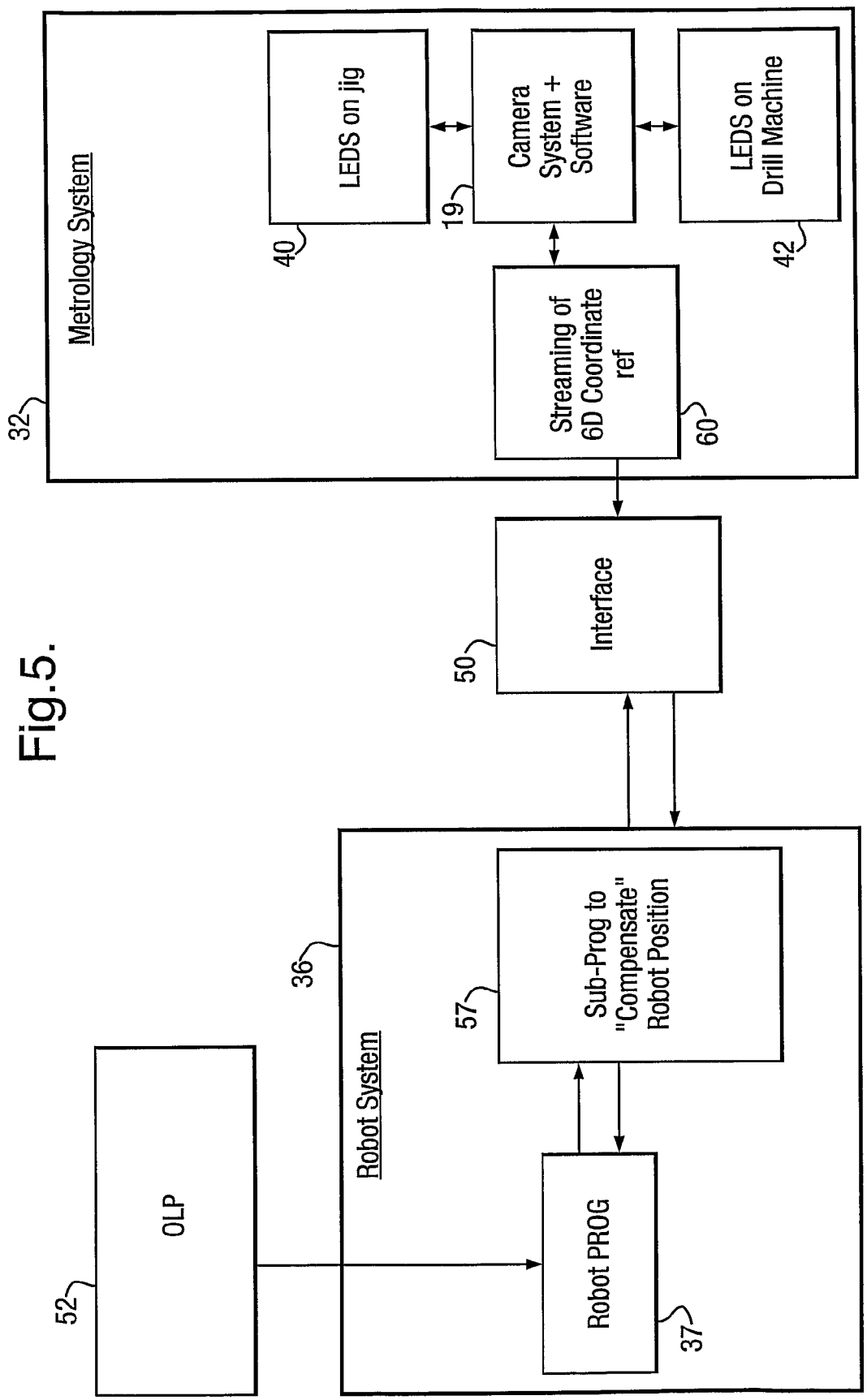

Embodiments of the present invention will now be described by way of example with reference to the accompanying drawings of which:

FIG. 1a is a perspective view of a program-controlled apparatus for machining a component using two robots, FIG. 1b is a further perspective view of the apparatus of FIG. 1a, but showing the robots semi-transparently for the sake of clarity FIG. 1c is a further perspective view form the side of the apparatus of FIG. 1a, again showing the robots semi-transparently, FIG. 2 is a perspective view of a jig of the apparatus used to hold the component during machining, FIG. 3 is a perspective view of the drilling machine used to effect machining of the component, FIG. 4 is a schematic diagram showing the processes used during the machining of a component with the apparatus, and FIG. 5 is a high-level schematic diagram illustrating the main component parts of the embodiment.

FIGS. 1a, 1b and 1c show an apparatus for performing a program-controlled process in which holes are drilled at predetermined locations on an intermediate component 10 that will ultimately form a D-nose (a component of an aircraft wing). The apparatus includes two robots 12, 14 for manipulating a jig 11 in which the component 10 is held, a fixed head drilling machine 16 with drilling tools 16a of a type standard in the art, a metrology system and a computer for controlling the operation of the apparatus. The jig 11, in which the component 10 is secured, is held at one end 11a by one 12 (the "master" robot) of the two robots and is held at the other end 11b by the other 14 (the "slave" robot) of the two robots.

The robots 12, 14, provided by KUKA Roboter GmbH (whose Headquarters are at Zugspitzstrasse 140, 86165 Augsburg, Germany), are Kuka Series 2000 KR250 robots and are each provided with a KL linear track. Each robot is therefore in the form of a six axis jointed arm robot and is able to carry a load of up to 240 kg. The robots are each provided with a drive unit that sends the signals to the motors that effect the movement of the robot. The drive unit is controlled by means of a PC-based robot controller (not shown in FIGS. 1a to 1c). During manufacture of the robots, each robot is calibrated by means of a CMM calibration (a calibration effected by a coordinate measuring machine, which measures objects in a coordinate based "space" or "measurement volume"). This CMM calibration uses Kuka Roboter algorithms to create a software mapping (comprising calibration data) to increase the spatial accuracy of the robot within its entire working volume to a tolerance specified as +/−1 mm from robot base to robot flange. This is known within the art as an "Absolute Accuracy" robot. Each robot thus has calibration data that enable the robot to work to accurate tolerances, despite the factors introduced during manufacture that would otherwise reduce accuracy. Without this calibration, standard robots can typically be 2 mm to 5 mm away from nominal in Cartesian space, and sometimes higher. Of course, standard robots are rarely truly specified in terms of spatial accuracy, but rather their task repeatability.

Once installed, the tools that a robot uses and the jig(s) that it works in or with can be calibrated with respect to the robot. This is most accurately done with an external CMM. Without this, the manual errors created when calibrating "on-line" will typically only make the error from nominal greater than the "out-of-box" error on the robot. Without an external CMM, the tolerances and accuracy of the manual calibration depend on the skill of the operator, the accuracy of the installation and the accuracy of the robot, because the robot (which is inherently inaccurate) is effectively used as the measurement device. Such a calibration process is called "Tool and Environment" calibration, as it is specific to the robot envelope within the robot cell environment.

Within the art "Tool and Environment" calibration of a standard robot, using the robot as a measurement device, would have an error of up to 10 mm, requiring touch-up (i.e. manual adjustment) of the robot program on almost all process points (the robot program being the sequence of commands that effects the movements of the robots 12, 14 to bring the drilling machine 16 into alignment with the component 10 at successive positions in accordance with the "process points", that is, the predetermined locations on the location at which holes are to be drilled).

Using an external CMM to initially calibrate an absolute accuracy robot typically yields tolerances of up to 3 mm. As such, the touch-up of the robot program is still necessary. Using specialist robot metrology software in addition to an external CMM, such as that supplied by Metris from Interleuvenlaan 15D, B-3001 Leuven, Belgium, could be used to reduce the error to about 1 mm. In this embodiment, two "cooperating robots" are used, and the need for the robots to know exactly where each other is in space is a pre-requisite. Also, errors of the order of a millimetre in relation to the location at which holes are drilled on the component are too high when machining certain aerospace components, such as a "D-nose". Such an error is therefore still unacceptably high in applications such as the present one. In addition to the difficulties inherent in any calibration method, there is a need, when calibrating such robots, for the software to approximate a large number of variables on a series of revolute joints, back into Cartesian space. Also, other effects, such as temperature and deflection underload, make accurate calibration of a robot in Cartesian space extremely difficult throughout its work envelope.

In the present embodiment, when machining a particular type and shape of D-nose, the robot controllers of the robots 12, 14 are each pre-programmed with commands that are used to effect the movements of the component relative to the drilling machine tool so that the component is brought into correct alignment (within a given degree of error depending on the accuracy of the calibration of the robots and the rest of the system) with the tool 16a so that the drilling machine is approximately aligned to drill the component at successive predetermined locations on the component 10. The pre-programmed commands are generated using Off-Line Programming (OLP) procedures and algorithms that are well known in the art. The OLP used in the present embodiment is that used in DELMIA V5 Robotics simulation software provided by Delmia Corporation (whose Worldwide Headquarters are at 900N, Squirrel Road, Auburn Hills, Mich. 48326 USA). The programming of two or more "cooperating robots", as shown in this embodiment, is also integrated with Kuka Robotics KIR Technology (Virtual Robot Controller). It will be appreciated that the use of OLP commands is not in itself sufficient to align the drilling machine and the component in accordance with the successive predetermined target locations on the component as a result of the difficulties associated with calibrating the system to perform with absolute accuracy (as described above). The present embodiment uses a metrology system, in a closed-loop vision and movement process, to improve accuracy as described in further detail below.

The metrology system is in the form of a "Krypton K610 series" CMM system, which is a 3-D coordinate dynamic measuring system provided by Metris of Interleuvenlaan 15D, B-3001 Leuven, Belgium and comprises an optical camera unit 18 and associated computer hardware and software (not shown in FIGS. 1a to 1c). The camera unit 18 houses three linear CCD cameras and is able to measure the 3-D position of an infrared LED with accuracy of the order of about 60 microns. The field of view of the camera is shown in the Figures by means of a notional envelope 20. As can be seen in FIG. 2, the jig 11 which holds the component 10 has attached to it eight infra-red LEDs 40 which allow the camera unit 18 to ascertain the position and orientation of the component 10 by means of detecting the position of the LEDs 40. Also, as can be seen in FIG. 3, the drilling machine 16 has attached to it four infra-red LEDs 42 which allow the camera unit 18 to ascertain the position of the drilling machine 16 by means of detecting the position of the LEDs 42. In both cases, the LEDs 40, 42 are powered by means of local power units and controlled wirelessly. In use, the LEDs are caused to strobe, lighting one LED at a time in quick succession, by means of the Krypton system computer hardware. The camera unit 18 then detects the radiation from the LEDs and sends the resulting data to the Krypton system computer hardware, which uses triangulation to identify the coordinates of each LED in a 3-D Cartesian coordinate system.

It will be appreciated, with reference to FIG. 1b for example, that the envelope 20 of the field of view of the camera unit 18 is not large enough that all of the LEDs 40 on the jig 11 will be visible all of the time. Also, the position of the component 10 and/or jig 11 may obscure some of the LEDs 40, 42 on the jig 11 and the drilling machine 16, because the camera unit 18 will not have direct line of sight of all LEDs. The system is however able to cope with such situations because the positioning of the LEDs on the jig 11 is such that at least three LEDs will be visible at any given time, thereby allowing the system to ascertain the orientation of the component at all times. The position of the drilling machine 16, despite being fixed, is also checked with the same frequency as the position of the component, so that the relative position of the target (drill 16a) is always known with respect to the component 10 (held by the robots).

The PC unit (not shown in FIGS. 1a to 1c) supplied by Kuka as their Kuka robot controller, is also arranged to provide a software and hardware interface between the robots 12, 14 and the metrology system, such that the metrology system streams the LED positions to the interface. Within this interface, the dynamic positions of the LEDS are processed to provide a 6DOF (6 degrees of freedom) frame that represents the position of the component 10 in space, relative to a 6DOF frame that represents the position of the target (drill 16) in space. These frames are processed into an ActiveX software interface, which also sits inside the Kuka robot controller. The robot program, as created in OLP, also resides and runs on the same Kuka robot controller. The robot program is created using the same two Cartesian space 6DOF reference frames for component 10 and drill 16, that, using the robots, move relative to each other. The robots are effectively informed several times during the processing of a component of the variance between the nominal position required by the robot program, and the actual position, thus allowing the robots to correct their respective positions so the robots hold the component in the correct position with respect to the drill, for each drilling process to accurately take place. The tolerance is user defined, and has been proven at 0.1 mm and 0.05°.

The use of the apparatus to make a D-nose aircraft component will now be described with reference to FIG. 4, which shows the various modules and processes that are used when manufacturing a component with the use of the apparatus shown in FIGS. 1a to 1c. The hardware of the apparatus shown in FIG. 4 includes the master robot 12, the slave robot 14, the metrology system 32 including the camera unit 18, the drilling machine 16, and a central computer system. The computer system, represented by box 34, performs various functions including controlling the movement of the robots 12, 14, the drilling operations performed by the drilling machine 16, and the interrogation of the metrology system. The computer systems 34 thus include a robot controller 36 for controlling both robots 12, 14 and a drill controller 38 for controlling the drilling machine 16. The computer system 34 interfaces, via a notional interface 50, between the metrology system 32 and the robot controller 36.

The metrology system 32 includes a camera unit 18, which is able to ascertain the position of the component 10 by means of ascertaining the positions of LEDs 40 mounted on the jig 11 holding the component 10, and is able to ascertain the position of the axis of the drill tool 16a of the drill machine 16 by means of ascertaining the positions of LEDs 42 mounted on the drilling machine 16. During use, the data acquired by the camera unit 18 from the positions of the LEDs 40, 42 is processed by means of the integrated computer system 44 and associated software.

With reference to FIG. 4, a CAD model 30 of the component to be machined is created. The CAD model 30 includes information defining the shape of the component 10 including information relating to features fixed in the position relative to the component, the features being recognisable by the metrology system 32, and also information concerning the drilling actions to be performed on the component including the positions of the holes on the component, the drill tool type to be used, and the direction in which the drilling action is to be performed.

OLP commands are created from the CAD model 30 by means of an OLP process, represented by box 52 to provide a sequence of commands passable by the robot controller 36 to cause the robots to make the movements necessary to move the component relative to the drilling machine to bring the component into approximate alignment (within an accuracy of the order of several millimetres) in respect of each location at which a hole is to be drilled. The OLP commands are calculated to bring the component and drill machine into exact alignment with each of a series of locations on the component, at which holes are to be drilled in accordance with the CAD model, assuming that the robots have absolute accuracy. The physical movements actually made in accordance with the OLP commands so calculated are unlikely to result in accurate alignment as a result of the robots not having absolute accuracy.

LEDs 40 are fixed to the jig 11 at a variety of locations. The component 10 is secured in position in the jig 11, the component and jig being so shaped that there is only one position relative to the jig 11 in which the component 10 (and future components of the same shape) may be secured to the jig 11. Thus the position of the LEDs 40 relative to the component 10 is fixed. The positions of the LEDS 40 on the jig 11 are calibrated in respect of the first component so to be machined. The calibration, which provides a relationship in software concerning the relationship between the positions of the LEDs 40 and the position of the component 10, comprises establishing a notional reference frame for the jig (and therefore the component) by using a calibrated portable CMM hand probe (called a SpaceProbe of the Krypton system). The hand probe is used to measure the position of each of the LEDs 40 relative to the position of the component, the position of which being ascertained with the metrology system, acting as a CMM system, by recognising the shape and position of the recognisable features comprised in the CAD model. A notional component reference frame is then set which is fixed relative to the LEDs 40 and the component 10. Thus the position of the notional component reference frame can subsequently be established from the positions of the LEDs 40 and the position of the component 10 may then be ascertained by knowing the position of the notional component reference frame. As well as during initial set-up, this facility may also be used for maintenance (i.e. when replacing a LED and/or re-referencing the system).

The definition of the notional component reference frame, which defines the relationship between the positions of the LEDs 40 and the component, is stored in the computer system 34. Information from the metrology system concerning the position of at least three of the LEDs 40 on the jig 11 is thus able to be used by the computer system 34 to ascertain the 6-D position and orientation of the component. LEDs 42 are also fixed to the drilling machine and calibrated in the same manner to produce a notional drilling machine reference frame, information concerning which also being stored in the computer system 34. As such, information from the metrology system 32 concerning the position of the LEDs 42 on the drilling machine 16 can be used to identify in fixed space the position of the fixed drilling machine and consequently the position of the axis of the drill tool 16*a*. Thus, the computer system 34 is able to ascertain the position of the component 10 relative to the drilling tool 16*a* of the drilling machine 16 by means of using information from the metrology system 32 obtained by ascertaining the relative positions of the two notional reference frames.

The master robot 12, runs the main OLP program, and as such needs to "know" where the jig 11 is with respect to the drill 16. This is achieved if the metrology system can see a minimum of 3-off LEDS 40 (i.e. three LEDs not lying on a single notional straight line in space) on the jig 11, and 3-off LEDS 42 on the drill. The positions and visibility of the LEDS are accounted for and form a part of the simulation and OLP process. They are therefore proven "off-line", before running in production. The slave robot 14 tracks the movements of the master robot 12 and is in effect geometrically coupled. Both robots 12, 14 are controlled from the same robot controller 36.

The master robot 12 is continuously informed of its relative position via the Active X interface that streams the actual 6-DOF positions in Cartesian space. As part of the "interface" 50 residing in the computer system 34, there is provided a software interface, using "cross-com", that acts as an input socket for the true notional reference frame positions measured by the metrology system 32 and as an input for the OLP 52, and decides how to move the robots to the correct position.

The robots 12, 14 are thus instructed, by means of the commands generated by the OLP 52 under the control of the computer system 34, to move the component to align the component relative to the drilling tool for the tool to drill the next hole at the next set location on the component 10, the position being corrected and adjusted if necessary thereafter with the use of the metrology system. This process is controlled by means of a control program module 54 of the computer system 34. First the robots are caused to move to the next coordinate (the start of this instruction being represented by box 56) by means of the computer system sending to the robot controller 36 the OLP commands that will move the component 10 to a target position such that the robot drilling tool is aligned approximately (within an error margin) over the location on the component to be drilled and in the correct direction for drilling (so that the axis of the hole to be drilled is aligned with the axis of the drill tool). It will be appreciated that such a target position can be defined by means of a coordinate system having five degrees of freedom. During the movement of the robots 12, 14 that causes the component 10 to move to the target position, the position of the component is tracked by means of the metrology system, the position of the component being ascertained with a frequency of 1000 Hz.

After the OLP commands have been effected by the robots 12, 14 in respect of the present coordinate 56 the target location of the component should be aligned with the drill tool 16*a* within a given margin of error (dictated by the absolute accuracy of the robot, which as mentioned herein, is not likely to be highly accurate), typically of the order of several millimetres. The position of the component 10 is then ascertained with the metrology system 32, and communicated to the robot controller and the interface 50 (Step 60). A closed-loop process is then conducted to ensure that the component is in the target position to within a preset threshold margin of error of ±0.1 mm and ±0.05°. The tolerance is stored in memory in the interface 50. This tolerance is based upon the minimum step size of the robot, as well as measurement certainty of CMM and is user-defined.

The closed-loop position-correcting process is illustrated in FIG. 4 as a subprogram, which is represented by box 57, of the control program module 54. The interface 50 effectively checks if the actual position attained is within tolerance 62 in relation to the target position and effects correcting movements until the desired target position is achieved. Thus, the sub-program starts (box 58) by requesting the metrology system 32 to provide details (box 60) of the current position of the notional component reference frame (and therefore the robots) relative to the notional drilling machine reference frame. The subprogram then calculates the difference, if any, between the actual relative position as measured with the metrology system and the target position (which may be considered as the "expected position" of the component in view of the positions of the robots and their current calibration data) and compares this difference with the preset tolerance thresholds, effectively enquiring whether the position is to tolerance (box 62). If the difference is greater than the threshold, then the relative position is not to tolerance (represented by the "No" box 64 in FIG. 4), and the position of the component is adjusted by means of the interface 50 instructing the robots 12, 14 to perform an appropriate corrective movement (represented by box 66). The new position is then checked again by starting the sub-program again (represented by box 58 of FIG. 4). The sub-program is a closed-loop process and thus continues adjusting the positions of the robots 12, 14 until the difference between the actual relative position of the component 10 and the target position is below the tolerance threshold (represented by the "Yes" box 68). It will of course be appreciated that there may be circumstances in which no correctional movement is necessary, in which case the relative position of the component is not adjusted.

Once the sub-program 57 for checking and, if necessary, correcting the position of the component is completed, the system 34 instructs (represented by box 70) the drill controller 34 to cause the drilling machine 16 to drill the hole in the component 10 with the appropriate tool 16*a*. If the drill tool 16*a* to be used is different from the previous tool that has been used, the new tool 16*a* is selected by the drilling machine 16 and moved into position during the movement of the component 10 into the target position. The depth drilled by the drill tool of the drilling machine varies from one hole to another, but in this embodiment the maximum depth to be drilled is less than 6 mm. The holes drilled pass from one side of the component to the other in the present embodiment.

Once the drilling of the hole at the current target coordinate on the component has been completed the process continues by moving onto the next coordinate (box 72) and the process is repeated by starting again (box 56) by processing that coordinate in the same way as the previous coordinate. Once all coordinates have been machined the program finishes, and the component may be removed from the jig 11.

A new component to be processed in accordance with the same OLP and CAD data may be installed in the jig 11 and the process repeated. Of course, given that the position of the component 10 relative to the jig 11 is fixed there is no need when repeating the process with a new component of the same shape to perform initial set-up of LED calibrations.

Those skilled in the art will appreciate that the core technology represented by the embodiment described above may be reproduced by combining a metrology system from Krypton, an OLP suite from Delmia, and a suitable pair of robots from Kuka including a robot controller installed on a PC, by creating the interface 50 and software program 54 that allow the apparatus to facilitate the dynamic coordinate measuring and the closed-loop position-correcting process that enables the component to be positioned in accordance with a target position to within a user-defined threshold. The interface 50 is of course provided partly by means of suitable software in the PC that performs the function of the above-described computer system 34 and partly by a suitable connection (software and/or hardware implemented) that effectively provides a communication link between the hardware of the Krypton metrology system 32 and the robot controller 36 of the computer system 34. This interpretation of the present embodiment is illustrated by means of FIG. 5, which shows the OLP 52 feeding into the robot controller 36. The standard programming of the robot by means of the OLP is represented by box 37. The metrology system 32 is connected to the robot system via the interface 50. In use the camera unit and integrated computer system 44 and associated software of the metrology system (collectively represented by box 19 in FIG. 5) receive signals from the LEDs 40 on the jig and from the LEDs 42 on the drilling machine and calculates practically in real-time the coordinates of the LEDs. This information is then passed to the interface 50 via streaming software (represented by box 60) that calculates and streams data defining the position of the component as a 6-D coordinate with almost zero latency. The interface 50 provides to the robot controller, on its request, a close to real-time indication of the absolute position of the component, in the form of a coordinate in the reference system used by the robots (the reference system being the position of a notional reference frame fixed to the component relative to a notional reference frame fixed to the drilling machine). The robot controller 36 is then able to compare this data on the position of the robots as measured by the metrology system 32 and make correctional movements as appropriate (by means of robot controller subprogram 57) as a closed-loop position-correcting process.

The embodiment described above has been developed to use robotic systems in applications requiring tolerances significantly higher than the tolerances to which the robotic systems are designed to operate in normal use. This gives a step forward in the potential deployment of robotics in high accuracy applications, whilst using the robots flexibility, re-programmability, and lower unit costs than bespoke automation. This will deliver low cost flexible automation.

Whilst the present invention has been described and illustrated with reference to a particular embodiment, it will be appreciated by those of ordinary skill in the art that the invention lends itself to many different variations not specifically illustrated herein. By way of example only, certain variations to the above-described embodiments will now be described.

Real-time checking of the position of the component during the movement of the component to the target location may or may not be conducted. It will of course be appreciated that not checking positions between process points would relieve and free up for other purposes processing power that would otherwise be used for this purpose.

Using a jig to hold a component may prove unsuitable with large components. In such a case, the jig may be dispensed with and the robots may be secured to the component via other means. Without the use of a jig, which determines the position of the component relative to the point of attachment of each robot to the jig and thereby allows the system to ascertain the absolute position of the component by reference to the previously calibrated LEDs fixed on the jig, there needs to be another way of ensuring that the system is able to accurately determine the absolute position of the locations to be processed (for example drilled) on the component. One way of achieving this aim is to place LEDs at predefined "key characteristic" points on the component, where the key characteristic is such that an LED may be secured in relation to the key characteristic with high accuracy. The key characteristic could for example be a corner on the component or a pre-formed hole in the component. The positions of such key characteristics would of course be provided as part of the CAD data provided to the system. LEDs could alternatively be placed in rough alignment with preselected positions on the component and then be calibrated by recognising features of the component defined in the CAD model of the component and detecting the positions of the LEDs in relation to such recognisable features. Such a calibration would of course be needed in respect of each component to be processed. At least some of the LEDs fixed on the component may themselves be fixed in relation to each other, by means of providing the LEDs pre-mounted on a sub-jig for attachment to the component. Such an LED calibration is similar to the calibration of the LEDs on the jig as performed during initial set-up of the system as described above.

Instead of the positions of the LEDs on the jig being calibrated with reference to features of the component recognisable by the metrology system, the recognisable features being derived from the CAD model, the position of the component relative to the LEDs may be ascertained by means of fixing the LEDs to the jig 11 at accurately predetermined locations that are in accordance with locations defined within the CAD model of the component. The LEDs may thus effectively be considered as recognisable features which form part of the CAD data. Of course relying on the positions of the LEDs without using the metrology system to calibrate the position of LEDs in relation to the shape of the component relies on the initial positioning of the LEDs to be at least as accurate as the user-defined tolerances to be used when performing processes at the predetermined locations on the component.

Particularly in the case where the component is large and massive, the component may be so configured that it bends or otherwise deforms under the action of gravity and so as it is manipulated in space by the robots may adopt a slightly different shape in dependence on its orientation relative to the ground. If the component is large, thermal expansion and contraction of the component can cause deformations of a size large enough to affect the accuracy of the above-mentioned embodiment. Also, if the component is very massive, the mass of the component may affect the calibration of the robot in that the joints and parts of the robot may deform under the weight of the robot. It will be appreciated that such deformations, even if they are simply elastic deformations, will affect the accuracy of the machining if not accounted for. In the case of very large or heavy components, LEDs may be provided at discrete positions spread over the whole of the component to enable the system to compensate for local deformation of parts of the robots and/or of the component. In such cases, the LEDs recognised by the metrology system when seeking to correct the positioning of the component relative to the machine for performing a process at a predetermined location on the component are preferably positioned locally in relation to the location on the component. In such cases, it will be appreciated that LEDs mounted on one region of the component may, during performance of the method, move relative to LEDs mounted on another region of the component.

The above-described embodiment has been described with reference to drilling holes in a component for an aircraft. It will of course be appreciated that the present invention has application in other industries and is not limited to machining of components or to the aerospace industry. For example, the drilling machine could be replaced with any machine for performing a localised process on a component, where high accuracy is required to ensure that the location at which the process is performed on the component is within an acceptable margin of error. Such a process might for example be to attach a part at a given location, to inspect the component at a particular location, or to perform a welding action.

More than one camera unit may be provided, which can allow the provision of fewer LEDs.

The OLP data and/or the CAD data may be produced far in advance of the machining of the component. Such data may for example be produced in a different country from the country in which the machining of the component is performed for example.

The correcting of the robots' positions may also result in a correction of the calibration data. The calibration of the robots may therefore update many times during the machining of a single component.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not delimit the scope of the independent claims.

The invention claimed is:

1. A method of performing a program-controlled process on a component comprising the following steps:
   a) providing
      (i) a component,
      (ii) a first machine arranged to perform a process at a target location on the component,
      (iii) a second, program-controlled, machine for effecting relative movement, in three dimensions and about a plurality of different axes, of the component and the first machine, the second machine being able, upon instruction, to move an object within an acceptable margin of error to a target position,
      (iv) a metrology system for ascertaining the position of the component relative to the first machine,
      (v) component data concerning the shape of the component and including details of a plurality of locations on the component at which processes are to be performed by the first machine, and
      (vi) process data including details of movements to be made by the second machine to enable processes to be performed by the first machine on the component at said plurality of different locations on the component,
   b) issuing a command to perform a process on the component at a target location on the component,
   c) in dependence on the process data, causing the second machine to effect relative movement of the component and the first machine towards a target position, at which the first machine and component are so positioned relative to each other that the first machine is aligned to perform a process at the target location on the component,
   d) ascertaining with the metrology system and the component data the relative position of the target location on the component and the first machine,
   e) calculating the relative movement required, if any, to move the component and the first machine to the target position by means of a calculation using inputs concerning (i) the expected position of the first machine relative to the component and (ii) the actual relative position of the component and the first machine as ascertained in step d),
   f) repeating steps (c), (d) and (e) as part of a closed-loop process until the second machine has effected relative movement of the component and the first machine to the target position with a given degree of accuracy,
   g) effecting a process with the first machine on the component, and
   h) repeating steps b) to g) in respect of a plurality of locations on the component in accordance with the process data.

2. A method according to claim 1, further including repeating steps b) to h) in respect of a plurality of components of the same shape.

3. A method according to claim 1, wherein the method includes a step of storing offset data concerning the difference between the position attained as a result of effecting movement in accordance with the process data in respect of a target location on the component and the target position.

4. A method according to claim 1, wherein step c) includes causing the second machine to effect relative movement of the component and the first machine towards the target position in dependence on offset data generated during a previous performance of the method and step c) is conducted before step e) is conducted.

5. A method according to claim 1, wherein, in respect of the steps performed in order for the first machine to perform a process at a single target location on the component, the second machine is caused to effect relative movement of the component and the first machine substantially the entire way to a position in accordance with the target location and then step (f) is performed for the first time.

6. A method according to claim 1, wherein the degree of accuracy of the movement of the component and the first machine to the target position achieved by means of step f) is defined in advance by preset criteria.

7. A method according to claim 1, wherein the process data is, in advance of the performing of the process at the first location, calculated from the component data.

8. A method according to claim 1, wherein the process data comprises commands passable by the second machine.

9. A method according to claim 1, wherein the process data is in the form of OLP data.

10. A method according to claim 1, wherein the component data is in the form of CAD data.

11. A method according to claim 1, wherein the metrology system is able to measure the position of a plurality of different parts of an object in a coordinate system having at least three degrees of freedom.

12. A method according to claim 1, wherein the metrology system is so arranged that during step (d) it ascertains the position of only certain points fixed in relation to the object to be measured.

13. A method according to claim 1, wherein the relative movement that the second machine is able to effect allows the first machine and the component to be moved relative to each other with at least five degrees of freedom.

14. A method according to claim 1, wherein the second machine comprises a plurality of robots for effecting the relative movement of the component and the first machine.

15. A method according to claim 1, wherein the second machine holds and moves the component relative to fixed space.

16. A method according to claim 15, wherein the second machine holds the component at two separate locations, the part of the component at each of the two locations being able to be moved in space by the second machine with at least three degree of freedom.

17. A method according to claim 1, wherein the metrology system outputs data concerning the relative position of the component and the first machine in a first coordinate system whereas the movements effected by the second machine are in response to commands using a second different coordinate system.

18. A method according to claim 1, wherein the first machine effects a process on the component with a direction having at least two degrees of freedom.

19. A method according to claim 1, wherein the first machine effects a machining action on the component.

20. A method according to claim 1, wherein the component has a mass greater than 1 Kg and has a maximum dimension of greater than 200 mm.

21. A component on which there has been performed processes by means of the performance of the method according to claim 1.

22. An apparatus for use in the manufacture of a component, the apparatus comprising:
   a first machine for performing a process on a component,
   a second, program-controlled, machine for effecting relative movement, in three dimensions and about a plurality of different axes, of the first machine and a component,
   a metrology system for ascertaining the position of the component relative to the first machine,
   a processor arranged to send signals to the second machine and to receive signals from the metrology system, and
   memory, accessible by the processor, for storing component data concerning the shape of the component and including details of a plurality of locations on the component at which processes are to be performed by the first machine, and for storing process data including details of movements to be made by the second machine to enable processes to be performed by the first machine on the component at said plurality of different locations on the component,
   the apparatus being arranged so that
   a) in use, process data stored in the memory is used by the processor to instruct the second machine to effect relative movement of the first machine and a component towards a target position, at which the first machine and component are so positioned relative to each other that the first machine is aligned to perform a process at a target location on the component,
   and so that
   b) in use, during each cycle of operation that results in the first machine performing a process on the component, the apparatus performs a closed-loop process resulting in the second machine effecting relative movement of the component and the first machine to a position in accordance with the target location with a given degree of accuracy,
   and the processor being so programmed that
   c) in use, the closed-loop process includes the processor repeating the following steps:
      i) obtaining a first input concerning the expected position of the first machine relative to the component,
      ii) ascertaining a second input concerning the actual relative position of the target location on the component and the first machine by means of data received from the metrology system and the component data stored in the memory, and
      iii) ascertaining whether the first and second inputs are such that the relative position of the component and the first machine is in accordance with the target position with a given degree of accuracy.

23. A processing unit for use in a method of performing a program-controlled process on a component, the method using a first machine to perform a process on the component at a target location on the component, a second, program-controlled, machine for effecting relative movement of the first machine and the component, and a metrology system for ascertaining the relative positions of the component and the first machine, the processing unit including a processor and a memory accessible by the processor, wherein
   a) the processor is so arranged as to be able in use:
      to send signals derived from process data stored in the memory to the second machine instructing the second machine to effect relative movement of the first machine and a component towards a position so that the first machine may then perform a process on the component at a target location on the component, the process data including details of the movements to be made by the second machine to enable processes to be performed by the first machine on the component at a plurality of different locations on the component, and
      to receive signals from the metrology system, which together with component data, stored in the memory, concerning the shape of the component and including details of said plurality of locations on the component, provide information concerning the actual relative position of a location on the component at which a process is to be performed and the first machine,
   b) the processor is so programmed that in use during each cycle of operation that results in the first machine performing a process on the component, a closed-loop process is performed during which the second machine effects relative movement of the component and the first machine to a target position, at which the first machine and component are so positioned relative to each other that the first machine is aligned, with a given degree of accuracy, to perform a process at the target location on the component,
   c) the processor is programmed to repeat the following steps during the performance of the closed-loop process:
      i) obtaining a first input concerning the expected position of the first machine relative to the component,
      ii) receiving and using data from the metrology system together with component data to ascertain a second input concerning the actual relative position of the target location on the component and the first machine, and iii) ascertaining whether the first and second inputs are such that the relative position of the component and the first machine is in accordance with the target position with a given degree of accuracy, until the processor ascertains that the relative position of the component and the first machine is in accordance with the target position with the given degree of accuracy.

24. Software for programming a processor of a processing unit, the processing unit including a memory and being for use in a method of performing a process on a component, the method using a first machine to perform a process on the component at a target location on the component, a second machine for effecting relative movement of the first machine and the component, and a metrology system for ascertaining the relative positions of the component and the first machine, the software enabling the processor, once programmed with the software, to be able in use:

a) to receive process data from the memory of the processing unit, and to send instructions to the second machine to effect relative movement of the first machine and a component to a position so that the first machine may then perform a process on the component at a target location on the component, the process data including details of the movements to be made by the second machine to enable processes to be performed by the first machine on the component at a plurality of different locations on the component, b) to receive data from the metrology system and component data, from the memory of the processing unit, the component data concerning the shape of the component and including details of said plurality of locations on the component, which together may be used to ascertain the actual relative position of a location on the component at which a process is to be performed and the first machine, and c) to perform a closed-loop process which enables the second machine to effect relative movement of the component and the first machine to a target position, at which the first machine and component are so positioned relative to each other that the first machine is aligned, with a given degree of accuracy, to perform a process at the target location on the component, wherein (d) the software includes a closed-loop module that is arranged to cause the processor to repeat the following steps:

i) obtaining a first input concerning the expected position of the first machine relative to the component, ii) receiving and using data from the metrology system together with component data to ascertain a second input concerning the actual relative position of the target location on the component and the first machine, and iii) ascertaining whether the first and second inputs are such that the relative position of the component and the first machine is in accordance with the target position with a given degree of accuracy, until the processor ascertains that the relative position of the component and the first machine is in accordance with the target position with the given degree of accuracy.

* * * * *